United States Patent [19]

Barnes et al.

[11] Patent Number: 4,848,579
[45] Date of Patent: Jul. 18, 1989

[54] FOOD CONTAINER

[75] Inventors: Robert C. Barnes, Hackettstown; John A. Caporaso, Wayne; Gerald J. Winter, Paterson; Jan Karwowski, Franklin Lakes, all of N.J.

[73] Assignee: Nabisco Brands, Inc., Parsippany, N.J.

[21] Appl. No.: 54,493

[22] Filed: May 27, 1987

[51] Int. Cl.$^4$ .................. B65D 81/34; B65D 21/02
[52] U.S. Cl. .................... 206/508; 206/499; 220/23; 220/23.83; 426/107; 426/113; 426/243; 426/523
[58] Field of Search ............. 206/216, 217, 503, 508, 206/499, 505, 514-520, 557, 558, 564; 99/339, 340, 357, 646 C; 220/4 C, 4 D, 20, 23, 23.4, 23.83, 23.6; 426/113, 114, 107, 115, 119, 120, 124, 234, 392, 394, 523

[56] References Cited

U.S. PATENT DOCUMENTS

| | | | |
|---|---|---|---|
| 1,717,974 | 6/1929 | Heinrichs | 220/23.83 |
| 1,908,806 | 5/1933 | Allen | 99/339 |
| 1,985,998 | 1/1935 | Koch et al. | 206/508 |
| 2,106,276 | 1/1938 | Heineman | 206/499 |
| 3,070,275 | 12/1962 | Bostrom | 220/20 |
| 3,144,016 | 8/1964 | Basci | 220/4 D |
| 3,240,610 | 3/1966 | Cease | 426/120 |
| 3,278,014 | 10/1966 | Thornton | 206/217 |
| 3,278,074 | 10/1966 | Yamazaki | 220/23 |
| 3,398,827 | 8/1968 | Laskin | 206/499 |
| 3,443,681 | 5/1969 | Wysocki | 206/508 |
| 3,685,717 | 8/1972 | Seiferth et al. | 206/499 |
| 3,708,086 | 1/1973 | Colato | 220/20 |
| 3,780,642 | 12/1973 | Bay | 426/113 |
| 3,796,813 | 3/1974 | Kurland | 206/219 |
| 4,040,561 | 8/1977 | Philippon | 206/217 |
| 4,081,646 | 3/1978 | Goltsos | 426/234 |
| 4,233,325 | 11/1980 | Slangan | 426/234 |
| 4,269,169 | 5/1981 | Guibert | 206/499 |
| 4,348,421 | 9/1982 | Sakakibara et al. | 426/124 |
| 4,420,093 | 12/1983 | Von Holdt | 206/508 |
| 4,435,434 | 3/1984 | Caporaso | 426/124 |
| 4,467,918 | 8/1984 | Blot | 206/503 |
| 4,486,640 | 12/1984 | Bowen et al. | 219/10.55 E |
| 4,600,592 | 7/1986 | Dobis | 426/120 |
| 4,806,699 | 4/1974 | Hannivig | 426/113 |

FOREIGN PATENT DOCUMENTS

| | | | |
|---|---|---|---|
| 0147746 | 7/1936 | Austria | 220/23 |
| 1098342 | 1/1961 | Fed. Rep. of Germany | 426/120 |
| 2741999 | 3/1979 | Fed. Rep. of Germany | 220/23 |
| 00401107 | 11/1933 | United Kingdom . | |
| 0661820 | 11/1951 | United Kingdom | 426/113 |
| 01304913 | 1/1973 | United Kingdom . | |
| 2106373A | 4/1983 | United Kingdom . | |
| 2120996 | 12/1983 | United Kingdom | 206/519 |

Primary Examiner—Jimmy G. Foster
Attorney, Agent, or Firm—Richard Kornutik

[57] ABSTRACT

A nestable container for storing and preparing a food comprises a base portion which holds the stored food and a lid. The stored food requires substantially less than the full volume of the base portion. The lid is recessed into the base portion being supported by the upper terminus of the side wall of the base portion. The lid may also have one or more recessed areas to hold a second food which is to be mixed with that in the base portion. In use the container is removed from the nested stack, the lid removed, milk or water added if the food in the container is a cereal and the contents heated. The lid can be used as a cover during heating. The second food contained in the lid can be added before or after heating.

16 Claims, 1 Drawing Sheet

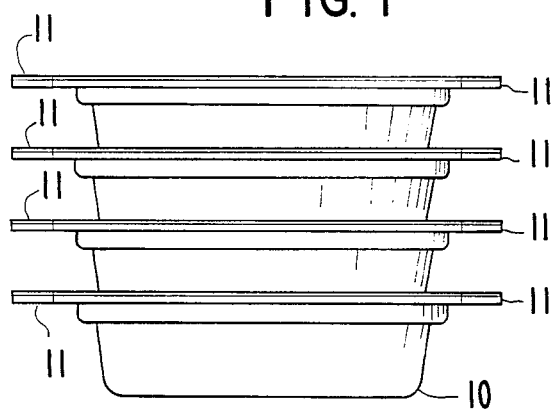
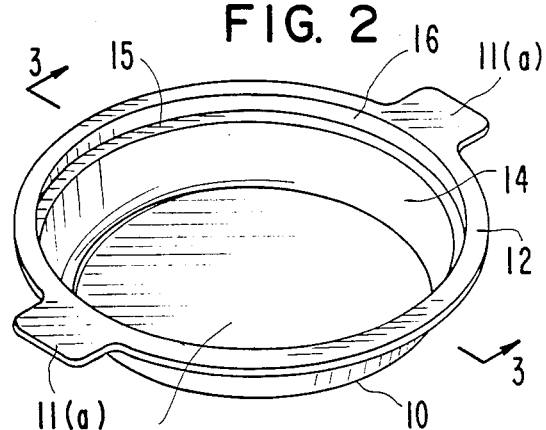
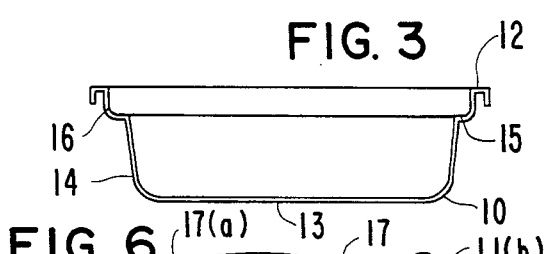
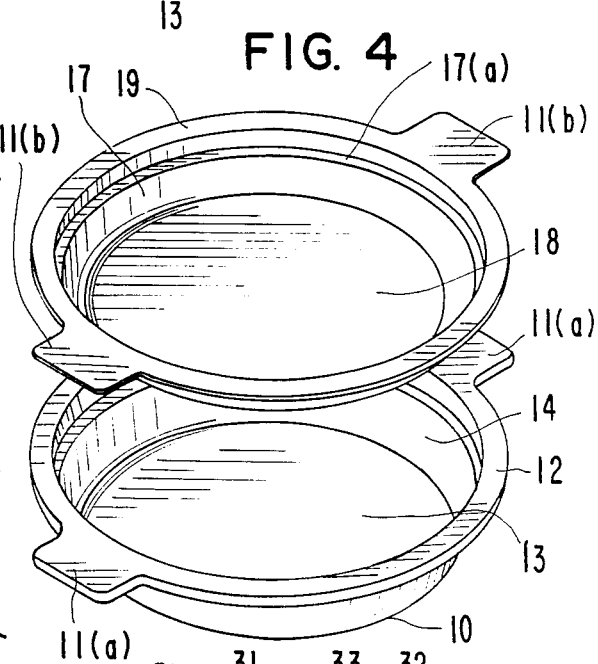
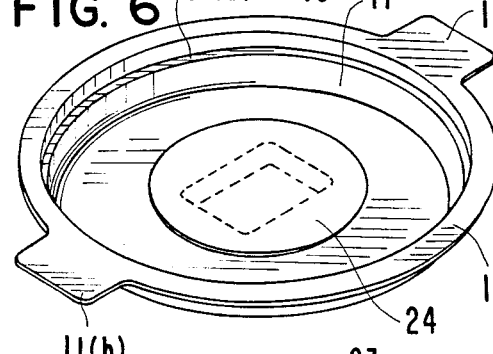
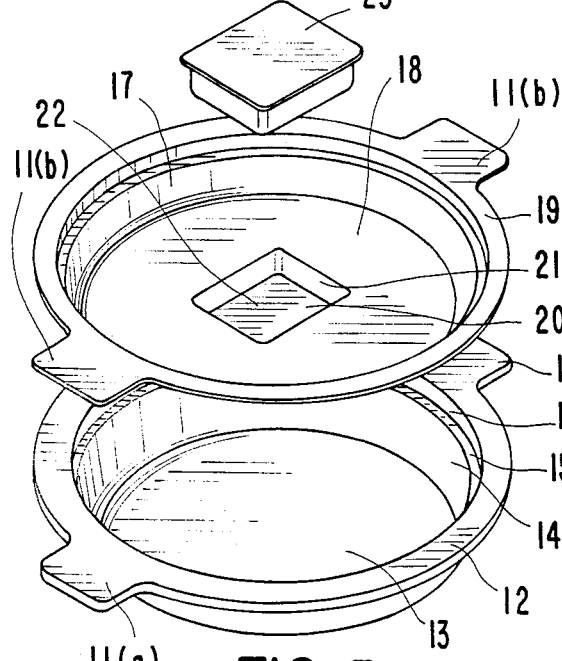
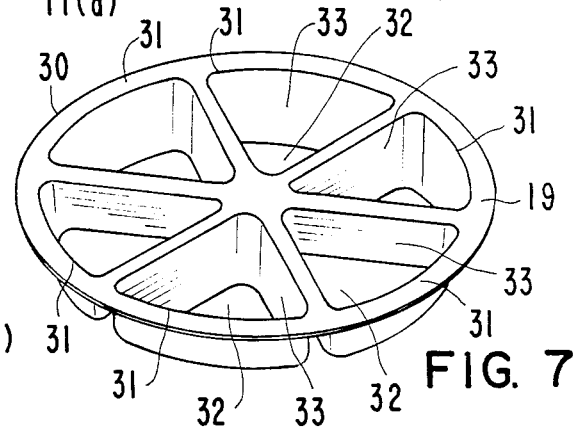
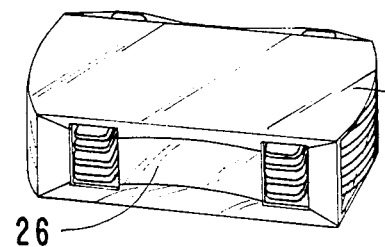

FOOD CONTAINER

BACKGROUND OF THE INVENTION

This invention relates to a nestable container for storing and preparing a food, and to the method for using this container to conveniently prepare a food. More particularly it relates to a container which can be easily stored and which is particularly useful in the ease of preparation of breakfast foods.

Present day society continually needs new ways to quickly and conveniently prepare foods. This is particularly the case with regard to breakfast foods. In the morning there is usually little time to prepare and eat a meal. As a result many people skip breakfast or have a quick snack. Nutritionally this is not ideal. Breakfast is known as the most important meal of the day. The present invention is directed to a microwavable food container and package and to a method of quickly and conveniently preparing a hot food, and in particular a hot breakfast food.

SUMMARY OF THE INVENTION

This invention is directed to a stackable, nestable container which contains a food that can be quickly and conveniently prepared for consumption. The container comprises a bowl which has a lid which fits in a recessed manner into the bowl. The upper periphery of the lid contacts the upper terminus of the bowl side wall, and is the primary sealing means of the lid to the bowl. The lid which fits down into the bowl may also contact a ledge in the side wall of the bowl. This is a secondary sealing area. The food is contained in the bowl between the recessed lid and the bottom of the bowl. The bowl preferably also has one or more handles so that it can be easily carried after heating.

The lid may also contain a recessed area where a second food item can be stored. This second food item can be in its own package or can be placed directly into the recessed area. If placed directly into the recessed area a foil or other seal must be placed over the recessed area. The bowls containing the food and sealed with a lid are then stacked in a nested condition and packaged for sale.

In order to prepare the food the user opens the package of nested bowls, chooses one and removes the lid by breaking the seal. If the food is a hot cereal, water or milk will be added. If the container is the embodiment where the lid has a second component, such as a fruit in a recessed area in the lid, the component is added before or after heating as directed. Heating is done in a microwave oven. As an option the lid, in an inverted mode, can be used as a cover for the bowl while it is being heated. After the food is consumed, the bowl and lid are discarded.

BRIEF DESCRIPTION OF THE DRAWINGS

FIG. 1 is a side elevational view of the stacked and nested containers.

FIG. 2 is a top perspective view of the bowl part of the container.

FIG. 3 is a sectional view of the bowl along line 3—3 of FIG. 2.

FIG. 4 is a top perspective view of the bowl and lid of the container.

FIG. 5 is a spaced elevational view showing the bowl, lid and a package contained in a recess in the lid.

FIG. 6 is a top view of the lid having a foil seal over the food item in the lid.

FIG. 7 is a top view of a lid having a plurality of recessed areas.

FIG. 8 is a side elevational view of a package containing eight nested containers.

DETAILED DESCRIPTION

In FIG. 1 there is shown a nested stack of the present containers containing a food item. The bowl 10 of each container 9 sits in the recessed lid of the next container. The handles of the containers are designated as 11.

FIG. 2 shows the bowl portion 10 of the container. This consists of bottom 13 with an upwardly extending side wall 14. This side wall is at an angle of 90° to the bottom or than 90° to the bottom so as to from a bowl which tapers toward the bottom. The bottom is the plane of the lowermost part of the bowl. The side wall carries a ledge 15 parallel or at an outward or flared angle to the bottom of the container at a point in the side wall. The side wall then continues upwardly terminating in an upper ledge 12. This upper ledge is usually substantially parallel to the bottom of the container. The handles of the bowl are designated as 11(a). FIG. 3 shows the bowl portion in more detail. This view more clearly shows the bowl bottom 13, the bowl side wall consisting of upwardly extending wall 14, ledge 15 which can be at a point from about 25 to 75 percent up the side wall, the continuation 16 of the side wall above the ledge 15 and upper ledge 12.

FIG. 4 shows the bowl and lid portions of the container. The lid consists of a main cover section 18 having an upwardly extending wall 17 which terminates in rim 19. Ledge 17(a) in wall 17 is adapted to mate with ledge 15 of the bowl portion. Handles 11(b) are an extension of the rim 19. The lid fits down into the bowl. The lid wall 17, ledge 17(a) and ledge 15 of the bowl provide a secondary seal for the food in the container. The primary seal is the result of the underside of rim 19 contacting and being releaseably bonded to upper ledge 12 of the bowl. The primary seal should be with a sealant or adhesive which leaves little or no residue upon the upper ledge 12 when the lid is removed. When functioning as a container the handles 11(a) of the bowl and 11(b) of the lid are preferably placed one over the other.

The lid may be made by thermoforming a suitable plastic material which may or may not be microwavable. The bowl may be made from conventional microwavable plastic materials. Although various techniques can be used to make the container and lid it is preferred to use thermoforming. This is a well utilized process and it produces articles having low deviations from unit to unit.

In use this container can hold liquid or solid foods. However, it would most likely be used with solid foods such as cereals. During storage and shipping the lid, since it is recessed into the bowl, maintains a cereal or other solid food in its filled volume. That is, since water or milk will have to be added, the cereal cannot fill the entire bowl. Some volume must be left for the added water or milk so the bowl with the lid removed has a volume greater than that to contain the cereal or other solid. Also, in keeping the solid at its filled volume using the recessed lid, the integrity of the solid is maintained. If there was a significant amount of extra space the particles of solid food would decrepitate through particle-particle contact and contact with the bowl and lid during handling. This is an added advantage provided by the present container. In addition the use of a recessed lid, with the bowl bottom of another container being nestable into the top of the lid, substantially reduces shipping volume and shelf space of a plurality of the containers or packages.

In FIG. 5 there is shown an embodiment where the lid has a recessed area 20 into which another food can be directly placed or into which a container 23 containing another food can be placed. This recessed area consists of bottom 22 and side walls 21. FIG. 6 shows this lid with a foil seal 24 to seal in a food that was placed directly into the recess. In either embodiment the top surface of the container 23 or foil seal 24 should be substantially flush with the top surface of the recessed lid portion so that the containers can properly nest. Also in either embodiment, a single lid may have a plurality of recesses; a lid having six recesses, for example may be used for the top-most containers like in a six-pack of nested containers. The remaining five lids in the six-pack would not have any recessed area 20.

FIG. 7 shows a lid 30 which contains a plurality of recesses 31. Each recess has a bottom 32 and side walls 33. These recesses can contain a packaged food or a food can be stored directly into each recess. If a food is placed directly into each recess, then a foil cover is placed over the top of each recess. In use in a nested array of containers the container with this lid will be the uppermost container since this lid carries the second component which can be added to the other containers in the stacked array.

FIG. 8 shows eight of the containers in a nested state and packaged for sale to the consumer. The nesting of the containers saves space. The package 25 is shown wrapped with a shrink film 26 wrapping. This will seal out dust and make the package more appealable.

In order to prepare the food, which is usually a cereal, a person opens the package of stacked containers, chooses one, and then removes the lid. For a hot cereal, water or milk is added pursuant to the instructions. About 1 to 1.5 cups is needed. Also, if the lid contained a fruit or other item, this is added at this point or after heating in accordance with the instructions. The bowl and contents are then heated in a microwave oven. The lid can be inverted and used as a cover at this stage. The prepackaged cereal is typically in flake form and is at least partially gelatinized. Exemplary of the cereals which may be packaged in the container for preparing a hot cereal by microwaving are instant wheat farina, instant oat cereals, instant rice, and instant mixed cereal grains. After heating, the cereal is eaten directly from the bowl. The bowl is discarded after eating.

What is claimed is:

1. A nestable container for use in the sale and in the preparation of a food comprising:
   (a) a base portion having a bottom and a continuous sidewall extending upwardly therefrom at an angle of at least 90 degrees to the bottom;
   (b) the sidewall at a given distance from said bottom having a ledge area and thereafter extending upwardly at an angle of at least 90 degrees to the bottom; and
   (c) a recessed lid portion, a rim of which sealably contacts the upper terminus of said base portion sidewall and which has a lid sidewall extending downwardly from said rim to intimately contact the ledge area and the sidewall of said base portion above and below said ledge area to form a seal with the ledge area and with the sidewall of said base portion to thereby maintain said food located therebelow.

2. A nestable container as in claim 1 wherein at the terminus of the side wall of said base portion there is a lid contact area for sealing said base portion to said lid.

3. A stackable container as in claim 1 comprising at least one handle at the terminus of the side wall of said base portion.

4. A nestable container as in claim 3 comprising at least one handle at the periphery of said lid portion.

5. A nestable container as in claim 1 comprising at least one recessed region in said lid suitable to hold a second food.

6. A nestable container as in claim 5 wherein said recessed region in said lid receives a package which contains the second food.

7. A nestable container as in claim 6 where said recessed region contains the food and has a cover thereover.

8. A nested package of containers as in claim 1 comprising a plurality of containers, each container consisting of a bowl portion and a lid portion, the lid portion of a container which shall receive a bowl portion of another container being recessed into the bowl portion, the lid portion of the uppermost container having a plurality of chambers for receiving items different from those in said bowl portions.

9. A method for storing and preparing a food comprising:
   (a) storing said food in a container which may be stacked in a nestable manner with other like containers, said container having a base portion and a lid portion, said lid portion being recessed into said base portion and the sidewall of said lid sealably engaging the sidewall and a ledge area of said base portion to retain said food in a lower part of said base portion;
   (b) removing at least one of said nested containers and removing the lid therefrom;
   (c) adding a further component to the food contained in said container; and
   (d) heating said food.

10. A method for storing and preparing a food as in claim 9 wherein said lid is recessed which permits storing a container in a nested condition.

11. A method for storing and preparing a food as in claim 9 wherein a liquid is added to the food contained in said container.

12. A method for storing and preparing a food as in claim 11 wherein said food is a cereal.

13. A method for storing and preparing a food as in claim 9 wherein said lid holds a second food item in at least one recessed area and said second food item is added to the food contained in the bowl portion of said container.

14. A method for storing and preparing a food as in claim 13 wherein said second food is added to said container prior to heating.

15. A method for storing and preparing a food as in claim 9 wherein said lid is inverted and used as a cover during heating.

16. A method for storing and preparing a food as in claim 9 wherein said heating is by means of microwave energy.

* * * * *